US010725907B2

(12) United States Patent
Tamura

(10) Patent No.: US 10,725,907 B2
(45) Date of Patent: Jul. 28, 2020

(54) INFORMATION PROCESSING APPARATUS FOR SPECIFYING DATA REGION OF GARBAGE COLLECTION, INFORMATION PROCESSING SYSTEM AND INFORMATION PROCESSING METHOD

(71) Applicant: FUJITSU LIMITED, Kawasaki-shi, Kanagawa (JP)

(72) Inventor: Masahisa Tamura, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 294 days.

(21) Appl. No.: 15/831,710

(22) Filed: Dec. 5, 2017

(65) Prior Publication Data

US 2018/0181338 A1 Jun. 28, 2018

(30) Foreign Application Priority Data

Dec. 27, 2016 (JP) ................. 2016-254035

(51) Int. Cl.
*G06F 12/02* (2006.01)
*G06F 3/06* (2006.01)

(52) U.S. Cl.
CPC ........ *G06F 12/0276* (2013.01); *G06F 3/0608* (2013.01); *G06F 3/0641* (2013.01); *G06F 3/0689* (2013.01); *G06F 3/0652* (2013.01); *G06F 3/0674* (2013.01)

(58) Field of Classification Search
CPC ............. G06F 12/0253; G06F 12/0261; G06F 12/0269; G06F 12/276; G06F 3/0641
See application file for complete search history.

(56) References Cited

U.S. PATENT DOCUMENTS

| | | | |
|---|---|---|---|
| 5,813,000 A * | 9/1998 | Furlani | G11B 27/034 |
| 10,452,297 B1 * | 10/2019 | Karr | G06F 3/0641 |
| 2005/0022009 A1 * | 1/2005 | Aguilera | H04L 63/0254 726/4 |
| 2008/0065639 A1 * | 3/2008 | Choudhary | G06F 7/02 |
| 2008/0313132 A1 * | 12/2008 | Hao | H04L 45/00 |
| 2010/0284405 A1 * | 11/2010 | Lim | H04L 45/00 370/392 |
| 2011/0276744 A1 * | 11/2011 | Sengupta | G06F 12/0866 711/103 |

(Continued)

FOREIGN PATENT DOCUMENTS

| | | |
|---|---|---|
| JP | 2013-514560 | 4/2013 |
| JP | 2014-199573 | 10/2014 |

*Primary Examiner* — William Spieler
(74) *Attorney, Agent, or Firm* — Fujitsu Patent Center

(57) ABSTRACT

An information processing apparatus includes: a memory configured to store a storage controlling program; and a processor configured to execute a process based on the storage controlling program, wherein the process includes: storing, in the memory, address information regarding an address of a unit region for which duplicate deletion of data was performed in the past and data information regarding data in the unit region as past information; generating, using the address information, first data information of a first unit region in a state in which duplicate deletion of data has been performed currently; and specifying a data region to be a target of garbage collection based on the data information in the past information and the generated first data information.

18 Claims, 10 Drawing Sheets

(56) References Cited

U.S. PATENT DOCUMENTS

| | | | |
|---|---|---|---|
| 2013/0031229 A1* | 1/2013 | Shiga | G06F 16/2255 709/223 |
| 2013/0036289 A1 | 2/2013 | Welnicki et al. | |
| 2014/0211659 A1* | 7/2014 | Abraham | H04W 8/005 370/254 |
| 2015/0046142 A1* | 2/2015 | Ramamoorthy | G06F 12/0802 703/21 |
| 2016/0011789 A1 | 1/2016 | Tsuchiya et al. | |

* cited by examiner

MANNER IN WHICH CHECK OF w IS PERFORMED IN
STATE IN WHICH x, y, and z ARE REGISTERED

INFORMATION PROCESSING APPARATUS FOR SPECIFYING DATA REGION OF GARBAGE COLLECTION, INFORMATION PROCESSING SYSTEM AND INFORMATION PROCESSING METHOD

CROSS-REFERENCE TO RELATED APPLICATION

This application is based upon and claims the benefit of priority of the prior Japanese Patent Application No. 2016-254035, filed on Dec. 27, 2016, the entire contents of which are incorporated herein by reference.

FIELD

The embodiment discussed herein is related to an information processing apparatus, an information processing system and an information processing method.

BACKGROUND

When a storage apparatus accumulates data, in order to reduce the data amount, the storage apparatus deletes duplicate data. However, in order to accurately manage the duplicate number of data, upon updating of the data, such processes as reading out of existing data, decrease the duplicate number of the read out data by one, writing of new data, and increase of the duplicate number of the new data by one are performed. Therefore, the updating process of data is delayed.

A related technology is disclosed in Japanese Laid-open Patent Publication No. 2014-199573 or Japanese National Publication of International Patent Application No. 2013-514560.

SUMMARY

According to an aspect of the embodiment, an information processing apparatus includes: a memory configured to store a storage controlling program; and a processor configured to execute a process based on the storage controlling program, wherein the process includes: storing, in the memory, address information regarding an address of a unit region for which duplicate deletion of data was performed in the past and data information regarding data in the unit region as past information; generating, using the address information, first data information of a first unit region in a state in which duplicate deletion of data has been performed currently; and specifying a data region to be a target of garbage collection based on the data information in the past information and the generated first data information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

For example, a storage apparatus has a function for GC that investigates, in place of management of the duplicate number of data, whether data under duplicate process is deleted and becomes unnecessary and recovers a data region that becomes unnecessary.

For example, in order to increase the deletion amount of data per a unit management data amount, duplicate deletion is not performed when the duplicate number is smaller than N, but the duplicate deletion is performed when the duplicate number is equal to or greater than N. For example, in order to achieve improvement of the performance of a storage system having a duplicate elimination function, a storage position specification table in which characteristic data of blocks and storage position information are associated with each other and a storage apparatus specification table in which storage apparatus identification information and characteristic data are associated with each other are used.

For example, according to the GC, a heavy process in which reading out of the overall area of a storage apparatus and a hash value arithmetic operation are performed may cause reduction of the response of the storage apparatus. For example, in top-k duplicate deletion by which duplicate deletion of all data is not performed but duplicate deletion of part of data having a high duplicate rate, for example, only of k (k is positive integer) such data from the top, the overall area of the storage apparatus is checked upon GC, and therefore, the GC may not be efficient.

For example, a system in which the efficiency of the GC in duplicate deletion is improved may be provided.

Figure 1:
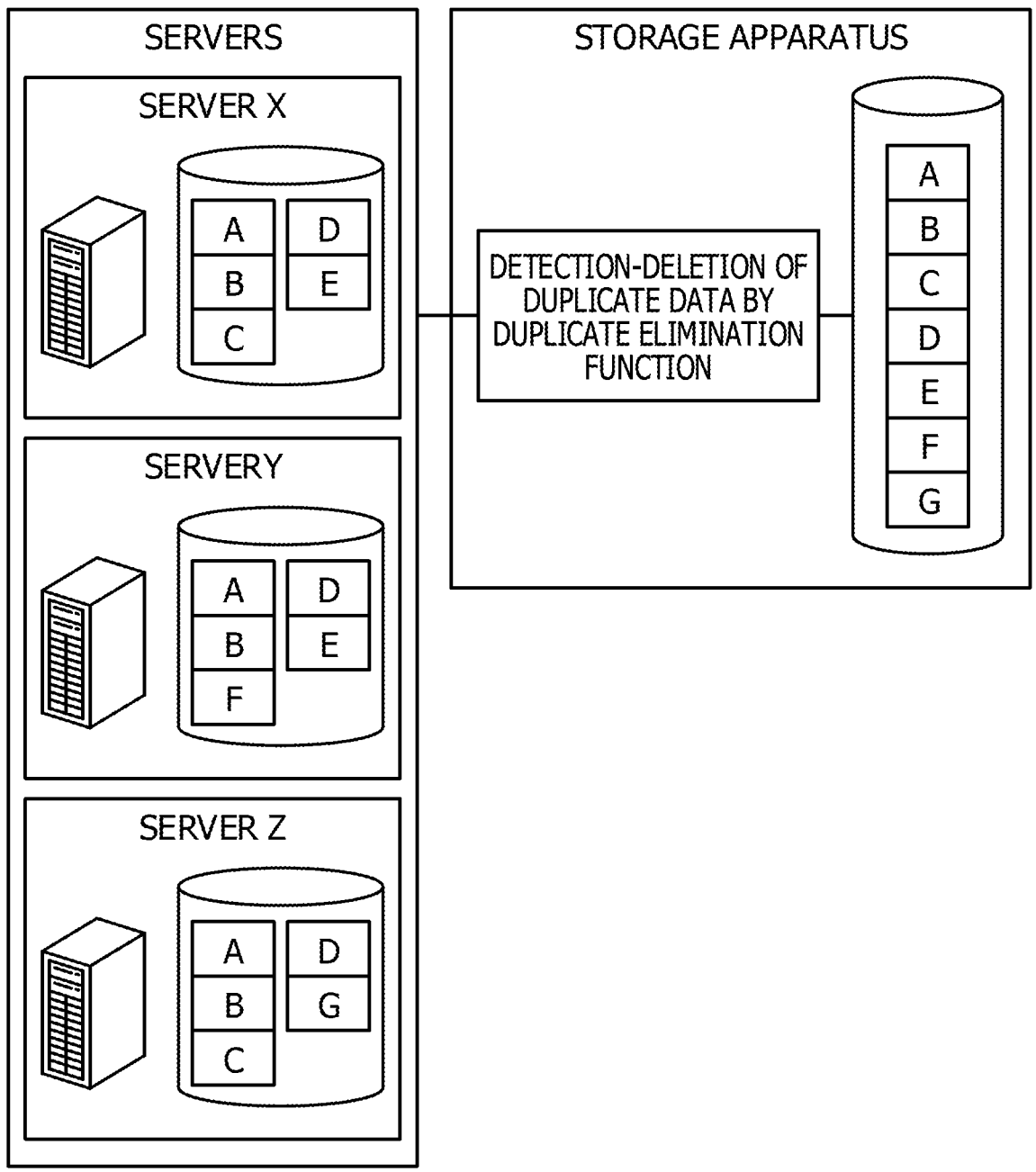
FIG. 1 is a view depicting an example of duplicate deletion.

FIG. 1 depicts an example of duplicate deletion. In FIG. 1, a case is depicted in which data stored in servers X to Z are backed up into a storage apparatus. The data stored in the servers are divided into blocks, and, if some blocks have the same substance, the storage apparatus stores the data to only one location.

In FIG. 1, data stored in the server X is divided into blocks of A to E; data stored in the server Y is divided into blocks of A, B, D, E, and F; and data stored in the server Z is divided into blocks of A to D and G. Since the blocks A, B, and D are stored in the servers and overlap each server, the storage apparatus stores the blocks A, B, and D only into one location. Since the block C and the block E are stored in the two servers X and Z and the two servers X and Y, respectively, the storage apparatus stores the blocks C and E only into one location.

By performing duplicate deletion in this manner, the data storage amount of the storage apparatus is reduced. For example, while data of a plurality of servers are backed up in FIG. 1, the storage apparatus may perform duplicate deletion of data of one server. For example, the storage apparatus may perform duplicate deletion of data of an apparatus other than the servers.

Figure 2:
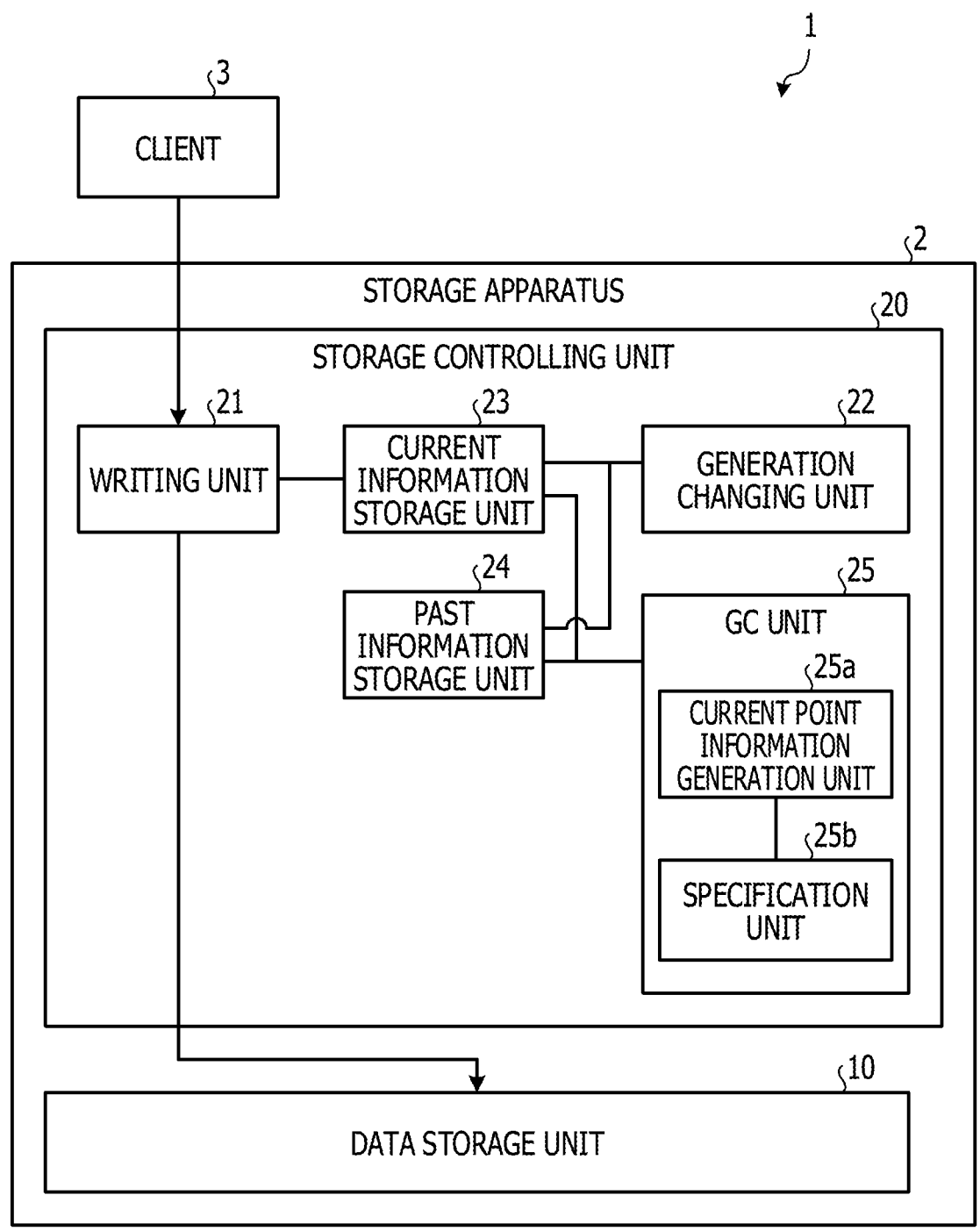
FIG. 2 is a view depicting an example of an information processing system.

FIG. 2 depicts an example of an information processing system. As depicted in FIG. 2, an information processing system 1 includes a storage apparatus 2 and a client 3.

The storage apparatus 2 is an apparatus for storing data and stores data on a magnetic disk. The storage apparatus 2 may otherwise store data on a different nonvolatile storage medium such as a NAND flash memory.

The client 3 is an apparatus for storing data into the storage apparatus 2, and may be, for example, a server. While only one client 3 is depicted in FIG. 2 for the convenience of illustration, the storage apparatus 2 may store data of a plurality of clients 3.

The storage apparatus 2 includes a data storage unit 10 and a storage controlling unit 20. The data storage unit 10 stores data that are utilized by the client 3 and stores information that is used for management of data.

The storage controlling unit 20 performs control of the storage apparatus 2. The storage controlling unit 20 includes a writing unit 21, a generation changing unit 22, a current information storage unit 23, a past information storage unit 24, and a GC unit 25.

Figure 3:
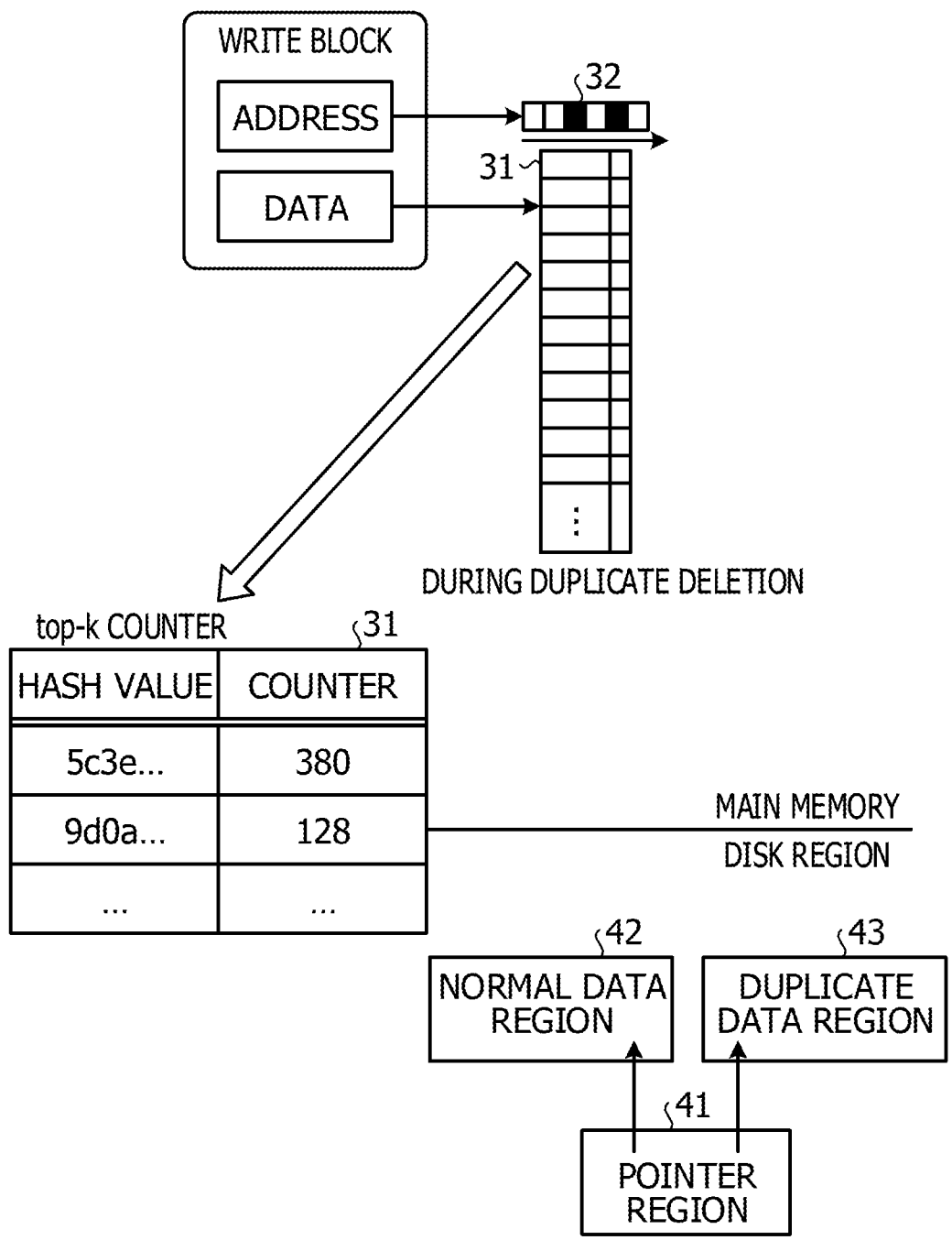
FIG. 3 is a view depicting an example of a writing process by a writing unit.

The writing unit 21 writes data into the data storage unit 10 based on an instruction from the client 3. FIG. 3 depicts an example of a writing process by a writing unit. The writing unit 21 divides data into writing blocks of a given size and writes the divided data into the data storage unit 10.

The writing unit 21 calculates a hash value from the data of each writing block, and, if the calculated hash value is registered in a top-k counter 31, the value of the counter of the top-k counter 31 is increased by one.

The top-k counter 31 is a table for associating hash values and counters with each other. A hash value is a value calculated by applying a hash function to data of a block. A counter is a number that is data calculated by applying a hash function to the corresponding hash value and is written in the data storage unit 10. The written data is not sometimes brought out of use. Accordingly, the counter does not indicate a number that is data calculated by applying a hash function to the corresponding hash value and is placed in the data storage unit 10. The top-k counter 31 has k entries in the descending order of the value of the counter.

The writing unit 21 performs a duplicate deletion process if the value of a counter exceeds a threshold value. For example, the number of blocks having the same data substantially equal to the number of the threshold value are stored into the data storage unit 10. In the following description, a hash value that is registered in the top-k counter 31 and in regard to which the value of the counter exceeds the threshold value may be referred to as hash value during duplicate deletion.

A block for which the duplication process has been performed is stored into a duplicate data region 43 of the disk region and a block for which the duplication process has not been performed is stored into a normal data region 42 of the disk region. A block is accessed through a pointer region 41 for associating a pointer to the duplicate data region 43 or a pointer to the normal data region 42 with an address of the block. The value of the pointer is a value based on a hash value of data of the block. The pointer region 41 is included in the disk region. The disk region is a region of a magnetic disk.

Figure 4:
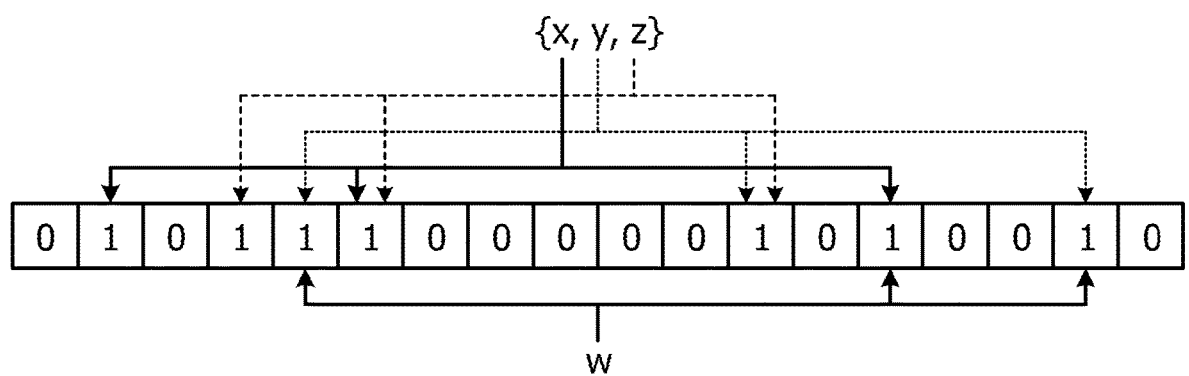
FIG. 4 is a view depicting an example of a bloom filter.

The writing unit 21 registers an address of a block for which duplicate deletion has been performed into a bloom filter (BF) 32. FIG. 4 depicts an example of a bloom filter. The bloom filter 32 has a stochastic data structure having a good space efficiency and is used for a test regarding whether an element is a member of a set.

The bloom filter 32 has characteristics that, although it has the possibility of false detection due to false positives, it is free from false negatives, that, although it allows addition of an element to a set, it does not allow deletion of such an element, and that, as addition of an element to a set increases, the possibility of false positives increases. The false positives indicates that, while an element is not a member of a set, the element is decided as a member. The false negatives indicates that, while an element is a member of a set, the element is decided not as a member.

The bloom filter 32 has an array of m (m is a positive integer) bits and all bits thereof have an initial value of 0. The bloom filter 32 is used together with i (i is positive integer) hash functions. Each of the hash functions maps a key value to m array positions.

In order to register an address of a block for which duplicate deletion has been performed into the bloom filter 32, the writing unit 21 inputs the address into the i hash functions to obtain i array positions and then sets the bits at the i array positions of the bloom filter 32 to 1. In FIG. 4, the bits at array positions calculated using respective three hash functions for addresses x, y, and z are set to 1.

In order to investigate whether an address of a block is registered in the bloom filter 32, the GC unit 25 inputs the address to the i hash functions to obtain i array positions. If at least one of the bit groups of the i array positions indicates 0, the GC unit 25 decides that the address is not registered in the bloom filter 32, for example, the duplicate deletion process has not been performed for the block.

If all bits of the i array positions indicate 1, the GC unit 25 decides that the address is registered in the bloom filter 32 or that all of the i bits became 1 by accident when a different address was registered (false positives). For example, when all bits of the i array positions are 1, the GC unit 25 decides that the possibility that the duplicate deletion process may have been performed for the block is high. In FIG. 4, reference character w denotes a case of the false positives.

The top-k counter 31 and the bloom filter 32 are stored in a main memory. Therefore, reference to the top-k counter 31 and the bloom filter 32 may be performed at a high speed in comparison with reference to the disk region.

The generation changing unit 22 depicted in FIG. 2 performs generation change periodically or in response to a situation of the top-k counter 31. The generation change indicates updating of the top-k counter 31. While block having duplicate data varies in accordance with lapse of time, the top-k counter 31 has only k higher order entries and is liable to be influenced by duplication of data in the past. Therefore, the generation changing unit 22 updates the top-k counter 31 periodically or in response to a situation of the top-k counter 31.

Figure 5:
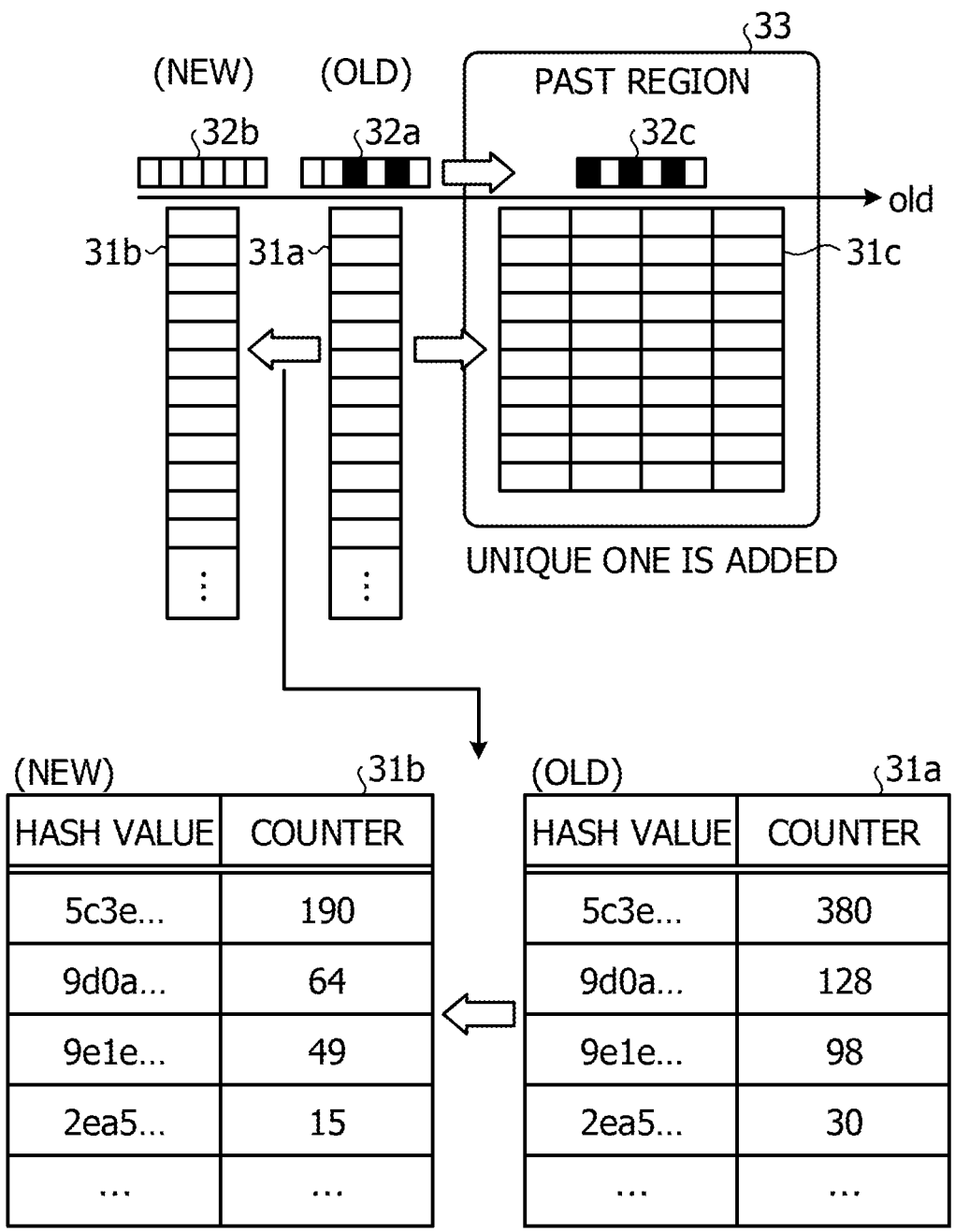
FIG. 5 is a view depicting an example of change of generations.

FIG. 5 depicts an example of change of generations. In FIG. 5, the top-k counter 31 in the old generation before generation change is represented by a top-k counter 31a and the bloom filter 32 in the old generation is represented by a bloom filter 32a. The top-k counter 31 in the new generation after generation change is represented by a top-k counter 31b and the bloom filter 32 in the new generation is represented by a bloom filter 32b.

As depicted in FIG. 5, the generation changing unit 22 performs merge of the top-k counter 31a and the bloom filter 32a in the old generation and a past region 33 and preparation of data in the new generation. The past region 33 includes a hash value region 31c that stores hash values of blocks for which the duplicate deletion was performed in the past and a bloom filter 32c in which addresses of the blocks for which the duplicate deletion was performed in the past are registered.

In the merge of the top-k counter 31a and the bloom filter 32a of the old generation and the past region 33, the generation changing unit 22 adds hash values that are not included in the hash value region 31c from among the hash values included in the top-k counter 31a to the hash value region 31c. The generation changing unit 22 logically ORs the bloom filter 32a and the bloom filter 32c to obtain a value of the bloom filter 32c.

In the data preparation for the new generation, the generation changing unit 22 prepares the top-k counter 31b based on the state of the top-k counter 31a. For example, the generation changing unit 22 reduces the counter values of the top-k counter 31a to ½ to prepare the top-k counter 31b. The generation changing unit 22 prepares the bloom filter 32b in which all bits are 0.

The current information storage unit 23 stores the top-k counter 31 and the bloom filter 32 of the current generation. The past information storage unit 24 stores the past region 33. For example, the past information storage unit 24 stores the hash value region 31c and the bloom filter 32c.

Figure 6:
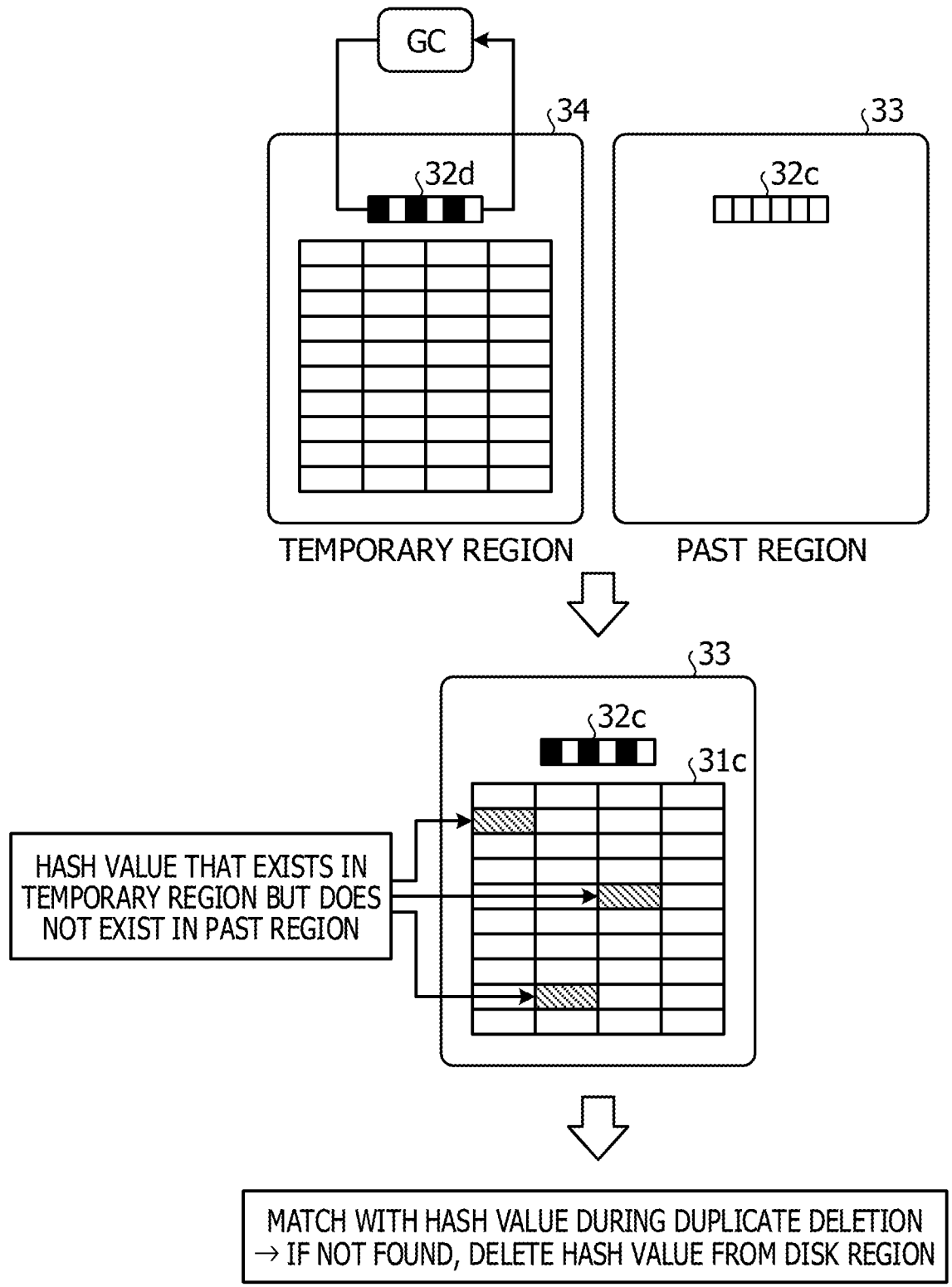
FIG. 6 is a view depicting an example of garbage collection (GC) by a GC unit.

The GC unit 25 specifies and recovers data regions that are not used any more as a result of rewriting of data or the like from among data regions for which a duplication process has been performed. FIG. 6 depicts an example of GC by a GC unit. As depicted in FIG. 6, the GC unit 25 copies the past region 33 into a temporary region 34 and then clears the past region 33.

The GC unit 25 decides whether or not the address of each block in the disk region is registered in a bloom filter 32d of the temporary region 34. If the address of a block is registered, since there is the possibility that the block may have been deduplicated, the GC unit 25 accesses the magnetic disk to check whether or not the block is deduplicated.

For example, the GC unit 25 reads out the pointer region 41 from the magnetic disk and checks, based on whether the pointer corresponding to the address of the block points to the normal data region 42 or points to the duplicate data region 43, whether or not the block is deduplicated. For example, when the data region in which the data of the block is stored may not be divided into the normal data region 42 and the duplicate data region 43, the GC unit 25 uses a flag, which indicates whether or not the block is deduplicated, in the pointer region 41 to check whether or not the block is deduplicated.

If the block is deduplicated, the GC unit 25 sets the address of the block to the bloom filter 32c of the past region 33 and decides whether or not the hash value of the data of the block exists in the hash value region 31c of the past region 33. If the hash value of the data of the block does not exist in the hash value region 31c of the past region 33, the GC unit 25 adds the hash value of the data of the block to the hash value region 31c.

For example, the GC unit 25 registers the address of the block, which is deduplicated at the present point of time, into the bloom filter 32c of the past region 33 and adds the hash value of the block, which is deduplicated at the present point of time, to the hash value region 31c of the past region 33.

If the process is completed for the overall disk region, the GC unit 25 specifies a hash value that exists in the temporary region 34 but does not exist in the past region 33, for example, a data region that may possibly be not used. The GC unit 25 decides whether or not the hash value is included in the top-k counter 31, for example, whether or not the hash value is a hash value that is being deduplicated, and if the hash value is not included in the top-k counter 31, the GC unit 25 specifies the data region as a data region that is not in use and recovers the data region.

The GC unit 25 includes a current point information generation unit 25a and a specification unit 25b. The current point information generation unit 25a registers the address of a block that is deduplicated at the present point of time into the bloom filter 32c of the past region 33 and registers the hash value of the block that is deduplicated at the present point of time into the hash value region 31c of the past region 33. The specification unit 25b specifies and recovers a data region that is not in use.

Figure 7:
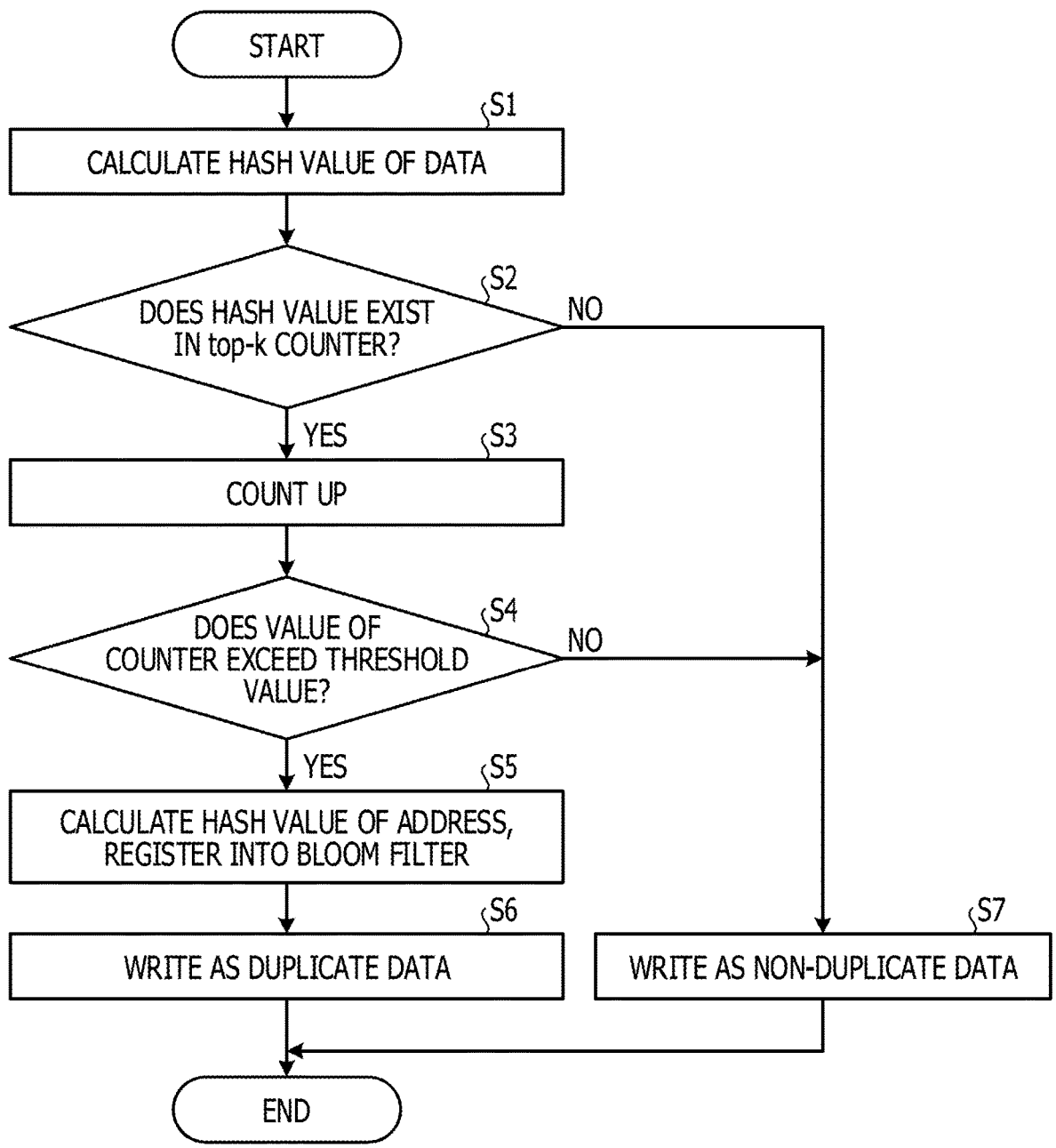
FIG. 7 is a view depicting an example of a writing process by a writing unit.

FIG. 7 depicts an example of a writing process by a writing unit. In FIG. 7, the process when one block is written into the data storage unit 10 is depicted.

As depicted in FIG. 7, the writing unit 21 calculates a hash value of data of a writing block (operation S1) and decides whether or not the calculated hash value exists in the top-k counter 31 (operation S2). If the calculated hash value exists in the top-k counter 31, the writing unit 21 counts up the counter corresponding to the hash value (operation S3).

The writing unit 21 decides whether or not the value of the counter exceeds a threshold value (operation S4). If the value of the counter exceeds the threshold value, the writing unit 21 calculates a hash value of the address of the writing block and registers the hash value into the bloom filter 32 (operation S5) and writes the hash value as duplicate data (operation S6).

If the value of the counter does not exceed the threshold value or if the calculated hash value does not exist in the top-k counter 31, the writing unit 21 writes the data as non-duplicate data (operation S7).

Where the writing unit 21 registers the address of a block, which is to be deduplicated, into the bloom filter 32 in this manner, the GC unit 25 may efficiently find out a data region, which is high in possibility that it may not be used, using the bloom filter 32 without accessing the magnetic disk.

Figure 8:
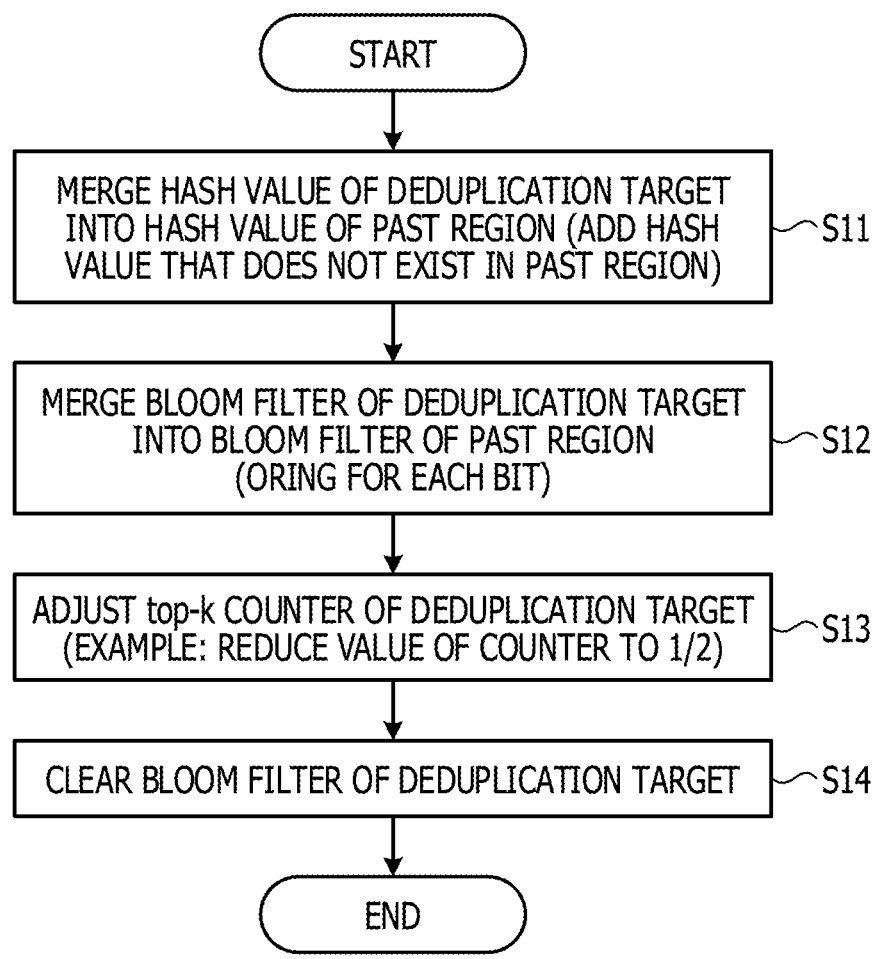
FIG. 8 is a view depicting an example of a generation changing process by a generation changing unit.

FIG. 8 depicts an example of a generation changing process by a generation changing unit. As depicted in FIG. 8, the generation changing unit 22 merges the hash value of a deduplication target into the hash value of the past region 33 (operation S11).

The hash value of the deduplication target may be a hash value included in the top-k counter 31a of the old generation depicted in FIG. 5. To merge represents to add, from among hash value included in the top-k counter 31a, a hash value that does not exist in the past region 33 to the past region 33.

The generation changing unit 22 merges the bloom filter 32a of the deduplication target into the bloom filter 32c of the past region 33 (operation S12). For example, the generation changing unit 22 logically ORs the bloom filter 32c and the bloom filter 32a for each bit and stores a result of the ORing into the bloom filter 32c.

The generation changing unit 22 adjusts the top-k counter 31a of the deduplication target (operation S13) to obtain a top-k counter 31b of the new generation. To adjust represents, for example, to reduce the value of the counter to ½. The generation changing unit 22 clears the bloom filter 32a of the deduplication target (operation S14) to obtain a bloom filter 32*b* of the new generation.

In this manner, where the generation changing unit 22 adjusts the top-k counter 31*a*, the storage apparatus 2 may cope with a time variation of duplicate data.

Figure 9:
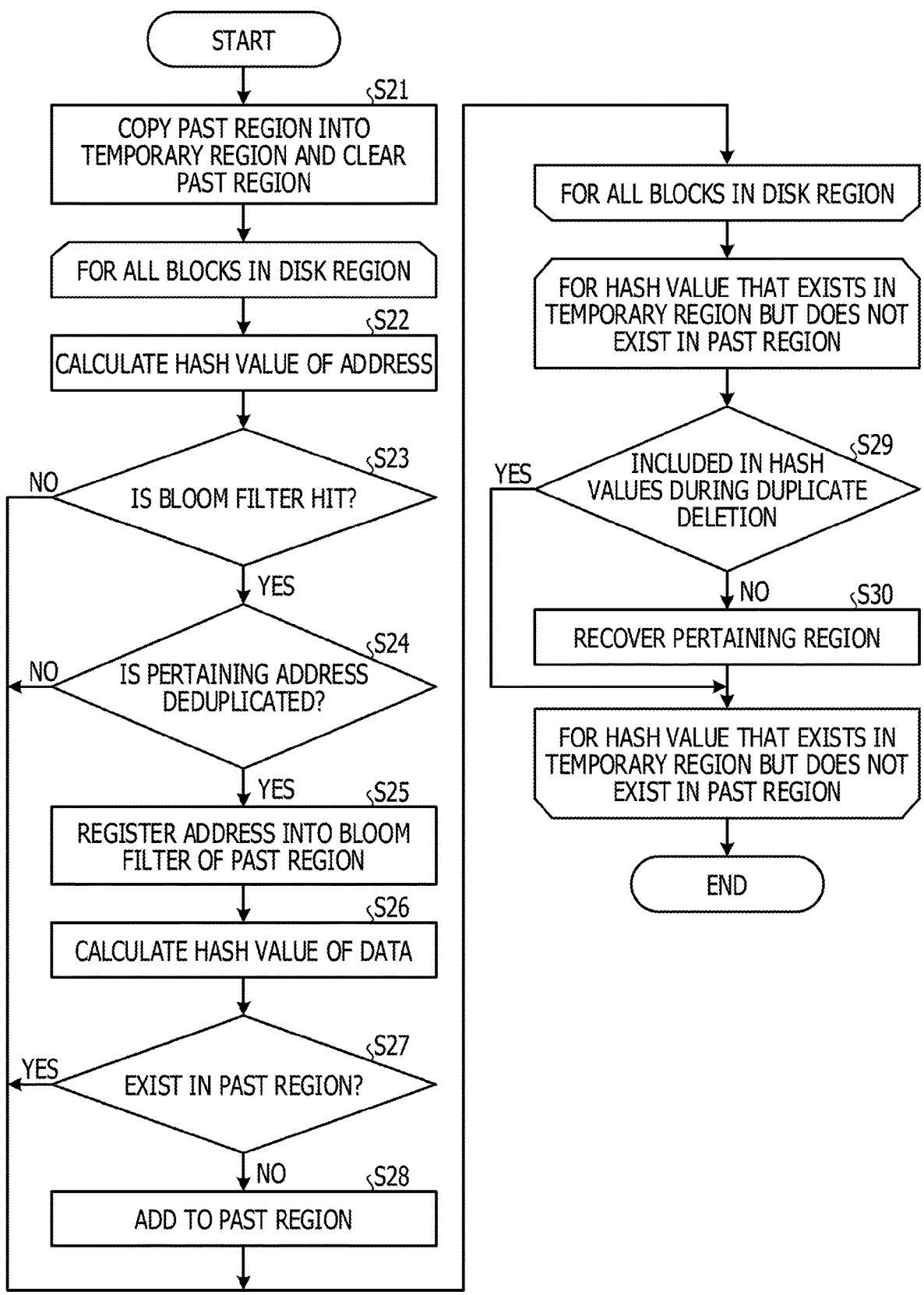
FIG. 9 is a view depicting an example of a GC process by a GC unit.

FIG. 9 depicts an example of a GC process by a GC unit. As depicted in FIG. 9, the GC unit 25 copies the past region 33 into the temporary region 34 and then clears the past region 33 (operation S21).

The GC unit 25 performs operations S21 to S28 for all blocks of the disk region. For example, the GC unit 25 calculates a hash value of the address of a block (operation S22) and decides whether or not the hash value hits the bloom filter 32 (operation S23). If the hash value does not hit the bloom filter 32, the GC unit 25 processes a next block.

If the hash value hits the bloom filter 32, the GC unit 25 decides whether or not the pertaining address is deduplicated (operation S24). If the pertaining address is not deduplicated, the GC unit 25 processes a next block.

If the pertaining address is deduplicated, the GC unit 25 registers the address into the bloom filter 32*c* of the past region 33 (operation S25) and calculates a hash value of the data (operation S26). The GC unit 25 decides whether or not the hash value exists in the past region 33 (operation S27), and if the hash value exists in the past region 33, the GC unit 25 processes a next block. If the hash value of the data does not exist in the past region 33, the GC unit 25 adds the hash value to the past region 33 (operation S28) and then processes a next block.

If the GC unit 25 completes the process for all blocks of the disk region, the GC unit 25 performs operations S29 and S30 for a hash value that exists in the temporary region 34 but does not exist in the past region 33. For example, the GC unit 25 decides whether or not a hash value that exists in the temporary region 34 but does not exist in the past region 33 is included in the hash values during duplicate deletion (operation S29), and if the hash value is included, the GC unit 25 processes a next hash value. If the hash value is not included in the hash values during duplicate deletion, the GC unit 25 recovers the pertaining region (operation S30). The pertaining region signifies a data region associated with the hash value.

When the GC unit 25 ends the process for all hash values that exist in the temporary region 34 but do not exist in the past region 33, the GC unit 25 ends the GC process.

In this manner, where the GC unit 25 specifies a block that may have been a target of deduplication in the past with high possibility using the bloom filter 32 of the past region 33, the access to the disk region is reduced and the efficiency of the GC process may be improved.

As described above, addresses of blocks for which duplicate deletion was performed in the past are registered in the bloom filter 32*c* of the past region 33, and hash values of data of the blocks for which the duplicate deletion was performed in the past are stored in the hash value region 31*c* of the past region 33. The GC unit 25 uses the bloom filter 32*c* to specify a block for which duplicate deletion of data may possibly have been performed at the present point of time. The GC unit 25 refers to the data storage unit 10 in regard to the specified blocks to specify blocks that are in a state in which duplicate deletion of data was performed at the present point of time. The GC unit 25 specifies data regions which are not to be used any more based on the hash values of the data of the specified blocks and the hash values included in the hash value region 31*c* and recovers the specified data regions as a target of the GC. Accordingly, the storage apparatus 2 may perform the GC with a high efficiency.

The generation changing unit 22 updates the past region 33 using the top-k counter 31*a* and the bloom filter 32*a* of the old generation. The generation changing unit 22 adjusts the top-k counter 31*a* to obtain a top-k counter 31*b* of the new generation and clears the bloom filter 32*a* to obtain a bloom filter 32*b* of the new generation. Accordingly, the storage apparatus 2 may cope with a time variation of duplicate data.

While the storage controlling unit 20 is described above, a storage controlling program having similar functions to those of the storage controlling unit 20 may be provided by executing the configuration of the storage controlling unit 20 by software.

Figure 10:
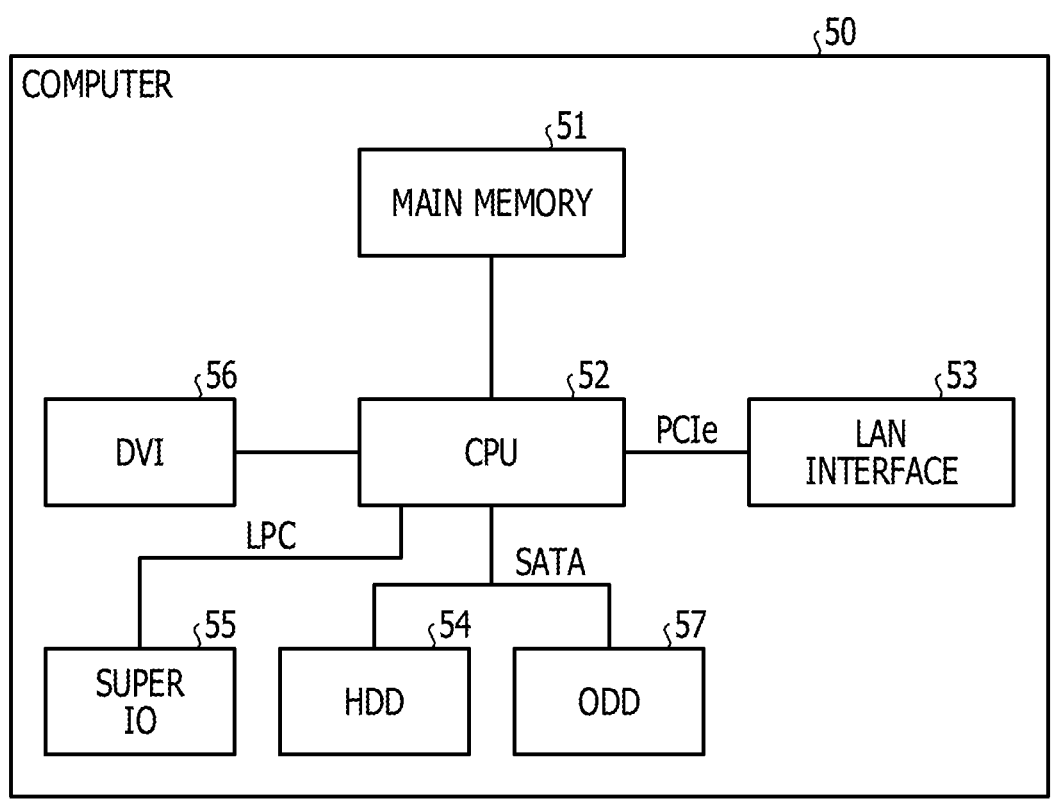
FIG. 10 is a view depicting an example of a hardware configuration of a computer that executes a storage controlling program.

FIG. 10 depicts an example of a hardware configuration of a computer that executes a storage controlling program. As depicted in FIG. 10, a computer 50 includes a main memory 51, a central processing unit (CPU) 52, a local area network (LAN) interface 53, and a hard disk drive (HDD) 54. Further, the computer 50 includes a super input output (10) 55, a digital visual interface (DVI) 56, and an optical disk drive (ODD) 57.

The main memory 51 is a memory that stores programs, interim results of execution of the programs and so forth. The current information storage unit 23 and the past information storage unit 24 depicted in FIG. 2 may be regions of the main memory 51. The CPU 52 is a central processing unit that reads out a program from the main memory 51 and executes the program. The CPU 52 may include a chipset including a memory controller.

The LAN interface 53 is an interface for coupling the computer 50 to a different computer through a LAN. The HDD 54 is a disk apparatus that stores programs and data. The data storage unit 10 depicted in FIG. 2 may be realized by the HDD 54. The super IO 55 is an interface for coupling an inputting apparatus such as a mouse or a keyboard. The DVI 56 is an interface for coupling a liquid crystal display apparatus, and the ODD 57 is an apparatus that performs reading out from and writing on a digital versatile disc (DVD).

The LAN interface 53 is coupled to the CPU 52 by a peripheral component interconnect (PCI) expression (PCIe), and the HDD 54 and the ODD 57 are coupled to the CPU 52 by a serial advanced technology attachment (SATA). The super IO 55 is coupled to the CPU 52 by a low pin count (LPC).

The storage controlling program executed by the computer 50 is stored on a DVD, read out from the DVD by the ODD 57, and installed into the computer 50. Alternatively, the storage controlling program is stored in a database or the like of a different computer system coupled through the LAN interface 53, read out from the database, and installed into the computer 50. The installed storage controlling program is stored into the HDD 54, read out into the main memory 51, and executed by the CPU 52.

The embodiment described above may be applied to top-k duplicate deletion and may be applied similarly also to duplicate deletion for all data.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An information processing apparatus comprising:
   a memory configured to store a storage controlling program; and
   a processor configured to execute a process based on the storage controlling program, wherein the process includes:
   storing, in the memory, address information regarding an address of a first unit region of a plurality of unit regions for which duplicate deletion of data was performed in the past and first data information regarding data in the first unit region as past information;
   generating, using the address information, second data information of a second unit region of the plurality of unit regions in which duplicate deletion of data in the second unit region has been performed; and
   specifying a data region to be a target of garbage collection based on the first data information in the past information and the second data information using third data information in which data and a writing number of writing the data into the memory are associated with each other.

2. The information processing apparatus according to claim 1, wherein the data region is disposed in the memory.

3. The information processing apparatus according to claim 1, wherein the processor:
   stores the address information as the past information into the memory using a bloom filter; and
   generates the second data information using the bloom filter.

4. The information processing apparatus according to claim 3, wherein the processor:
   decides that an address of the second unit region is included in the bloom filter;
   decides, by referring to the memory, that the address of the second unit region corresponds to an area of the memory which stores a unit region in which duplicate deletion of data is performed; and
   generates the second data information for the second unit region.

5. The information processing apparatus according to claim 3, wherein the processor:
   specifies a third unit region including data which is included in the second data information and is not included in the first data information; and
   specifies the third unit region as the data region when the data is not included in the third information or when the data is included in the third information and the writing number corresponding to the data exceeds a threshold value.

6. The information processing apparatus according to claim 1, wherein each of the unit regions is a block, and the first data information is a hash value.

7. An information processing system comprising:
   an information processing apparatus including a memory configured to store a storage controlling program and a processor configured to execute a process based on the storage controlling program; and
   a client apparatus configured to store data in the information apparatus, wherein the process includes:
   storing, in the memory, address information regarding an address of a first unit region of a plurality of unit regions for which duplicate deletion of data was performed in the past and first data information regarding data in the first unit region as past information;
   generating, using the address information, second data information of a second unit region of the plurality of unit regions in which duplicate deletion of data in the second unit region has been performed; and
   specifying a data region to be a target of garbage collection based on the first data information in the past information and the second data information using third data information in which data and a writing number of writing the data into the memory are associated with each other.

8. The information processing system according to claim 7, wherein the data region is disposed in the memory.

9. The information processing system according to claim 7, wherein the processor:
   stores the address information as the past information into the memory using a bloom filter; and
   generates the second data information using the bloom filter.

10. The information processing system according to claim 9, wherein the processor:
    decides that an address of the second unit region is included in the bloom filter;
    decides, by referring to the memory, that the address of the second unit region corresponds to an area of the memory which stores a unit region in which duplicate deletion of data is performed; and
    generates the second data information for the second unit region.

11. The information processing system according to claim 9, wherein the processor:
    specifies a third unit region including data which is included in the second data information and is not included in the first data information; and
    specifies the third unit region as the data region when the data is not included in the third information or when the data is included in the third information and the writing number corresponding to the data exceeds a threshold value.

12. The information processing system according to claim 7, wherein each of the unit regions is a block, and the first data information is a hash value.

13. An information processing method comprising:
    storing, in a memory, address information regarding an address of a first unit region of a plurality of unit regions for which duplicate deletion of data was performed in the past and first data information regarding data in the first unit region as past information;
    generating, by a computer, using the address information, second data information of a second unit region of the plurality of unit regions in which duplicate deletion of data in the second unit region has been performed; and
    specifying a data region to be a target of garbage collection based on the first data information in the past information and the second data information using third data information in which data and a writing number of writing the data into the memory are associated with each other.

14. The information processing method according to claim 13, wherein the data region is disposed in the memory.

15. The information processing method according to claim 13, further comprising: storing the address information as the past information into the memory using a bloom filter; and generating the second data information using the bloom filter.

16. The information processing method according to claim 15, further comprising:
    decides that an address of the second unit region is included in the bloom filter;
    deciding, by referring to the memory, that the address of the second unit region corresponds to an area of the memory which stores a unit region in which duplicate deletion of data is performed; and
    generating the second data information for the second unit region.

17. The information processing method according to claim 15, further comprising:
    specifies a third unit region including data which is included in the second data information and is not included in the first data information; and
    specifies the third unit region as the data region when the data is not included in the third information or when the data is included in the third information and the writing number corresponding to the data exceeds a threshold value.

18. The information processing method according to claim 13, wherein each of the unit regions is a block, and the first data information is a hash value.

* * * * *